United States Patent [19]

Bokram

[11] Patent Number: 5,716,056
[45] Date of Patent: Feb. 10, 1998

[54] INTERNALLY SQUEEZING SEALABLE COLLET

[76] Inventor: William E. Bokram, 409 N. Main St., Marine City, Mich. 40839

[21] Appl. No.: 647,232

[22] Filed: May 9, 1996

[51] Int. Cl.⁶ .................................................. B23B 31/107
[52] U.S. Cl. .......................... 279/46.2; 279/46.9; 279/44; 279/83; 279/157; 403/288; 403/362; 403/366; 409/234
[58] Field of Search .......................... 279/43.1, 43.9, 279/46.1, 46.2, 46.9, 44, 45, 83, 54; 409/234; 403/288, 362, 366, 372; 408/239 R, 239 A, 240

[56] References Cited

U.S. PATENT DOCUMENTS

| | | | |
|---|---|---|---|
| 2,533,179 | 12/1950 | Redinger | 279/83 |
| 2,754,716 | 7/1956 | Bourns | 411/479 |
| 3,139,800 | 7/1964 | Clarkson et al. | 409/234 |
| 3,501,182 | 3/1970 | Buchsbaum | 403/362 |
| 3,598,432 | 8/1971 | Walker | 403/366 |
| 3,962,953 | 6/1976 | Brady et al. | 409/234 |
| 4,661,009 | 4/1987 | Tripp | 279/157 |
| 5,096,212 | 3/1992 | Walsh | 279/44 |
| 5,324,050 | 6/1994 | Kanaan | 279/46.9 |
| 5,348,319 | 9/1994 | Stolzer | 279/46.1 |
| 5,369,988 | 12/1994 | Selby | 73/54.28 |
| 5,601,295 | 2/1997 | Baker | 279/83 |

FOREIGN PATENT DOCUMENTS 2015904  9/1979  United Kingdom ............ 279/46.2

*Primary Examiner*—Steven C. Bishop
*Attorney, Agent, or Firm*—Christopher John Rudy

[57] ABSTRACT

Collet includes a housing having a wall with external and internal surfaces, having opposing ends, and having an internal hollow portion with at least one opening; and a flap internal of the opposing ends of the housing in the wall and over part of the internal hollow portion of the housing such that, when a suitably firm force is applied from external to the flap, a suitable object such as a rotary tool bit inserted in the internal hollow portion of the housing through the at least one opening can be held securely in place at least partly inside the housing by the flap. The flap may be provided, for example, by two radial slits which may extend into the wall to coincide with the diameter of the housing and which are connected to one axially directed slit. Seal(s), for example, O-ring(s), may be provided between the flap and either end or both ends of the housing and/or internally between the tool shaft and internal collet wall. The collet can be assembled with a collet holder and rotary bit. One collet holder can have a set screw recess provided to ameliorate deformation from tightening a set screw in its housing wall.

7 Claims, 1 Drawing Sheet

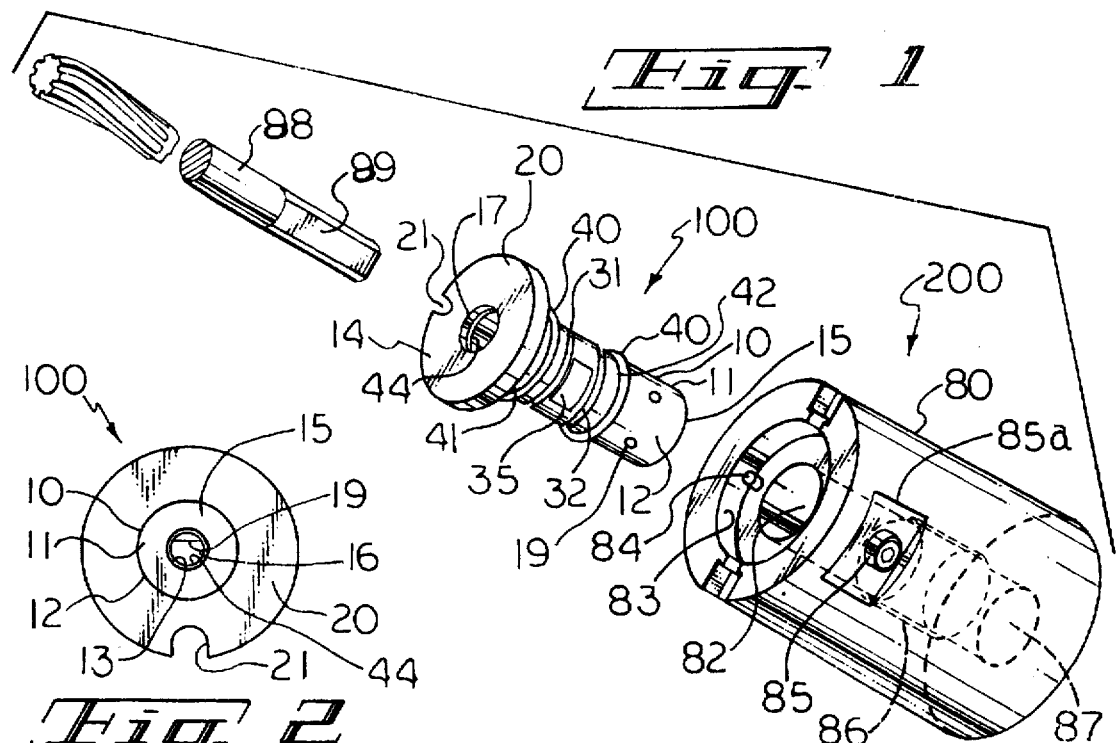
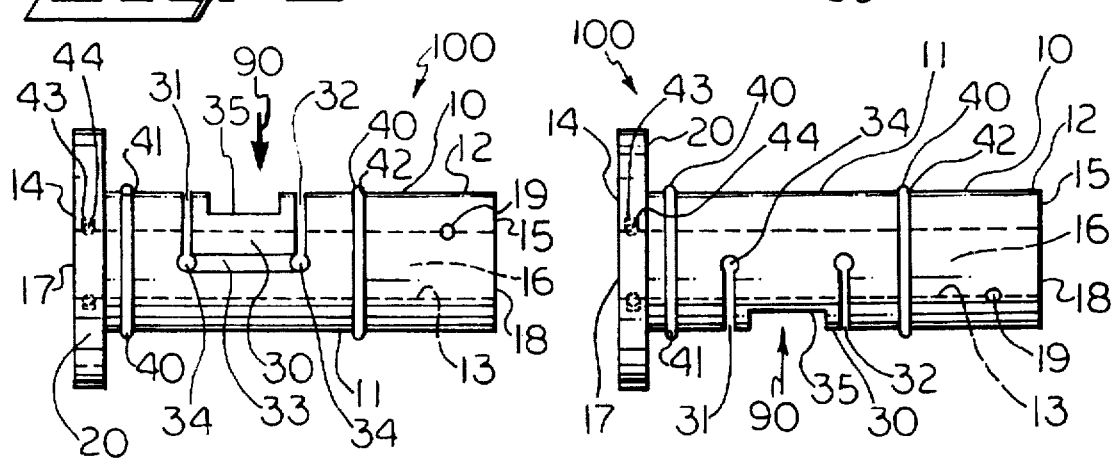

INTERNALLY SQUEEZING SEALABLE COLLET

FIELD

The present invention concerns a collet, and a collet holder, the same being useful in securing machine parts.

BACKGROUND

In machine manufacturing such as in the manufacture of internal combustion engine components, many orifices are made by rotary cutting or drilling operations, and these require close tolerances. For example, in modern automobile engines, valve and valve guide holes are provided, often four per cylinder, and these generally have tolerances on the order of a thousandth of an inch or less. Such operations are carried out with rotary cutting or drilling tools such as drill and reamer bits. Typically, the bits are secured in place by collets and collet holders.

A known type of collet employs a hollow tube slit at an end thereof and in a direction corresponding to the axis of rotation of the tube. Squeezable "fingers" may thus result. Force exerted inwardly on the fingers squeezes the fingers in so as to contact and secure the tool or shaft therein. See, e.g., Selby, U.S. Pat. No. 5,369,988, FIGS. 1, 2, 5, 6 & 7, for a special version of the known type.

In machine manufacturing, since it is undesirable to have a set screw touch the shaft of the rotating tool, the aforementioned type of collet has been employed extensively. The so-called Jacobs chuck with the aforementioned collet type is an example of this.

However, in machine manufacturing, there are drawbacks to the aforementioned collet type. Among these may be mentioned the following: First, the elongate slits, which are exposed at the end of the collet, collect dirt, and with tolerances so close in the manufacturing process, removal of the bit to provide the assembly with a sharp replacement can be difficult if not nearly impossible. Second, such a collet cannot easily have its slots sealed to keep it from dirt and other materials such as high pressure coolant.

It would be desirable to overcome these drawbacks.

SUMMARY

The present invention provides a collet comprising a housing having a wall with external and internal surfaces, having opposing ends, and having an internal hollow portion with at least one opening thereto; and a flap internal of the opposing ends of the housing in the wall and over part of the internal hollow portion of the housing such that, when a suitably firm force is applied from external to the flap, a suitable object inserted in the internal hollow portion of the housing through the at least one opening can be held securely in place at least partly inside the housing by the flap. Seal(s) may be provided between the flap and either end or both ends of the housing and/or internally between the tool shaft and internal collet wall. Collet holder and rotary bit assemblies with the aforesaid collet are also provided. One collet holder can have a set screw recess provided to ameliorate deformation from tightening.

The invention is useful in securing machine parts.

Significantly, drawbacks such as those mentioned above are ameliorated or overcome. In a particular, the present invention can provide for high precision; the collet can avoid undesirable accumulations of dirt, and it can be sealed effectively.

Numerous further advantages attend the invention.

DRAWINGS

The drawings form part of the specification hereof. In the drawings, which are not necessarily drawn to scale, and in which like numerals refer to like features, the following is briefly noted:

FIG. 1 is an exploded, perspective view of a collet holder-rotary bit assembly with a collet of the invention.

FIG. 2 is a rear view of the collet depicted in FIG. 1.

FIG. 3 is a left side view of the collet from FIG. 2.

FIG. 4 is a right side view of the collet from FIG. 2.

ILLUSTRATIVE DETAIL

The invention can be more fully understood by reference to the present detail. The same is to be construed in an illustrative, and not necessarily limiting, sense.

With reference to FIGS. 1–4, the following is noted:

Collet 100 has housing 10 having a wall 11 with external surface 12, internal surface 13, opposing ends 14 & 15 and internal hollow portion 16. The internal hollow portion 16 opens to the environment external to the collet 100 by openings 17 & 18. Stop pin 19 may be present and pass through the wall 11 and part of the internal hollow portion 16. Guide plate 20 with guide post recess 21 may be present at end 14 of the housing 10.

The collet 100 also has flap 30, which is in a position internal of the opposing ends 14 & 15 of the housing 10. The flap 30 is in the housing wall 11 and resides over part of the internal hollow portion 16 of the housing 10. The flap can be defined by a series of slits of suitable length internal of the opposing ends 14 & 15 of the housing 10 which perforate the housing wall 11 from external surface 12 to internal surface 13, for example, by two radial slits 31 & 32 which may extend into the wall 11 to coincide with the diameter of the housing 10 and which are connected to one axially directed slit 33. The slits can be made, for example, by cutting through the wall 11, and slit pilot holes 34 may remain after the flap 30 has been so defined. Recessed platform 35, which may be scored, knurled or otherwise roughened, may be present in or on the outside surface 12 of housing 10, notably in or on the flap 30.

Optionally, one or more seals are provided between the flap 30 and either or both ends 14, 15 of the housing 10. For example, two O-rings 40 may be present as seals, which can be placed in radial seal grooves 41 & 42 in the housing 10. In addition, seal(s) may be provided in the internal hollow portion 16 of the housing. For example, in inside groove 43 in the housing 10 may be placed another O-ring 44 to seal between the outside diameter of an inserted tool shaft and the inside diameter of the hollow portion 16 of the housing 10. Preferably, the O-rings are made of a rubber or other suitable rubbery composition and so forth, for example, of National Seal compound B46A.

As can be appreciated from the depiction of FIG. 1, the collet 100 may be employed as part of a collet holder and rotary bit assembly 200 and be received thereinto. Collet holder 80 in general may have housing 81 with hollow 82, or internal hollow portion, and at least one opening thereto to accommodate the collet 100 snugly. In general, the housing 81 is inclusive of a wall with external and internal surfaces, and the housing 81 has opposing ends. Recess 83 with guide post 84 can snugly accept the guide plate 20 with its guide post recess 21, and set screw 85 is typically present. The set screw 85 is capable of securing the collet 100 in the hollow 82 of the collet housing 81. An orifice for the set screw 85 is in the housing wall and opens to the internal and external surfaces thereof. A set screw recess area 85a can be present, which can ameliorate deformation in the housing 81 caused from tightening the set screw 85. Such a deformation may on the order of a thousandth of an inch, or more or less, but, be that as it may, the deformation may cause a collet holder to bulge out around its set screw so as to make the collet holder asymmetrical. With the recess area 85a, the bulged material remains beneath an external, imaginary, continued boundary of the collet holder 80, for example, beneath the external boundary of a cylinder. The collet holder 80 may have internal female threads 86 to mate with the male threads of a rotational machining shaft (not depicted) and channel 87 to accommodate a screwing tool tip to accomplish the mating. Rotary bit element 88, for example, a drill or reaming bit, may be inserted into the internal hollow portion 16 of the collet housing 10 and in fairly snug contact with the internal surface 13 of the wall 11. Flat recess 89 may form a key with shoulder stop, for registry with the stop pin 19 inside the internal hollow portion 16 of the collet 100.

In the practice of the invention, when a suitably firm force (arrow 90) is applied from external to the flap 30 of the collet 100, a suitable object inserted in the internal hollow portion 16 of the housing 10 through the at least one opening such as selected from openings 14, 15, can be held securely in place at least partly inside the housing 10 by the flap 30. For example, the force may be applied by turning the set screw 85 when the collet 100 is in collet holder 80, and the suitable object may be the reaming tool bit 88.

As for the shape of the collet or assembly, any suitable shape may be employed. For instance, the collet housing 10 may be generally tube like or be any other shape suitable for employment such as to conform to collet holder 80, and, in particular, the surface to mate with the external surface 12 of the collet 100 on the inside hollow 82 of the collet holder 80.

Dimensions of the collet and assembly therewith may vary widely, as desired for or required by various industrial applications. For example, dimensions in inches (there being 2.54 centimeters to the inch for metric conversions) of the collet 100 and assembly 200 as depicted in FIGS. 1-4, useful in drilling or reaming valve lifter and valve guide holes in automobile internal combustion engines, include the following, which may be considered to be approximate:

| Feature | Dimension |
| --- | --- |
| Housing 10 tube outside diameter | 0.5 |
| Housing 10 length from 14 to 15 | 1.75 |
| Internal hollow portion 16 diameter | 0.25 |
| Stop pin 19 distance from end 15 | 0.1875 |
| Guide plate 20 diameter | 0.875 |
| Guide plate 20 thickness | 0.125 |
| Slit 31 distance from end 15 | 0.875 |
| Slit 32 distance from end 15 | 1.375 |
| Radial seal groove 41 distance from end 15 | 0.64 |
| Radial seal groove 4, distance from end 15 | 1.5 |
| Radial seal grooves 41 & 42 widths | 0.031 |
| Collet holder 80 outside diameter | 1.625 |
| Collet holder 80 length | 5. |

In general, components of the invention can be made of any suitable material such as metals to include steel, and engineering plastics, and the same can be made by known methods such as casting, molding, cutting, lathing, grinding and so forth. Steel, for example, of SAE 4150 designation, is preferred for the housing 10 of the collet 100 and housing 81 of the collet holder 80, particularly as part of the assembly 200.

The invention can hold rotary tool bits most securely. As well, high precision machine operations can be provided with the invention. For example, tolerances to within one five thousandth of an inch or better such as to one ten thousandth of an inch are possible herewith. Moreover, as regards employment of the seals, high pressure cutting coolants can be employed, while yet keeping the slits and collet of the invention substantially free from dirt, chips, and other contamination. Also, in particular embodiments, this collet design offers quick tightening and loosening by use of a hex key wrench, requiring minimal force, thus reducing tool change time. It maintains proper axial alignment of the inserted tool shank with the axis of rotation.

CONCLUSION

The present invention is thus provided. Numerous modifications can be effected within its spirit, the literal claim scope of which is particularly pointed out as follows:

I claim:

1. A collet comprising a housing having a wall with external and internal surfaces, having opposing ends, and having an internal hollow portion with at least one opening thereto; and a flap internal of the opposing ends of the housing in the wall and over part of the internal hollow portion of the housing such that, when a suitably firm force is applied from external to the flap, a suitable object inserted in the internal hollow portion of the housing through the at least one opening can be held securely in place at least partly inside the housing by the flap, wherein an axially directed slit and two radially directed slits intersect to define the flap, and at least one seal is present between the flap and one of the opposing ends of the housing, and at least one seal is present between the flap and the other of the opposing ends of the housing.

2. The collet of claim 1, wherein the seals are O-rings.

3. A collet comprising a housing having a wall with external and internal surfaces, having opposing ends, and having an internal hollow portion with at least one opening thereto; and a flap internal of the opposing ends of the housing in the wall and over part of the internal hollow portion of the housing such that, when a suitably firm force is applied from external to the flap, a suitable object inserted in the internal hollow portion of the housing through the at least one opening can be held securely in place at least partly inside the housing by the flap, wherein an axially directed slit and two radially directed slits intersect to define the flap, and at least one internal seal is present in the internal hollow portion of the housing.

4. The collet of claim 3 wherein the seals are O-rings.

5. An assembly comprising the following components:

a collet including a housing having a wall with external and internal surfaces, having opposing ends, and having an internal hollow portion with at least one opening thereto; and a flap internal of the opposing ends of the housing in the wall and over part of the internal hollow portion of the housing such that, when a suitably firm force is applied from external to the flap, a suitable object inserted in the internal hollow portion of the housing through the at least one opening can be held securely in place at least partly inside the housing by the flap;

a collet holder including a housing having a wall with external and internal surfaces, having opposing ends, and having an internal hollow portion with at least one opening thereto; and a tool, wherein the tool is inserted into the internal hollow portion of the collet, and the tool and collet sub-assembly is inserted into the internal hollow portion of the collet holder, and wherein an axially directed slit and two radially directed slits intersect to define the flap of the collet.

6. The assembly of claim 5, wherein at least one seal is present between the flap and at least one of the opposing ends of the housing of the collet, and at least one internal seal is present in the internal hollow portion of the housing of the collet.

7. The assembly of claim 6, wherein the seals are O-rings.

* * * * *